United States Patent [19]

Wilkinson, Jr. et al.

[11] Patent Number: 4,542,426
[45] Date of Patent: Sep. 17, 1985

[54] FLEXIBLE HUB FOR REMOVABLE DISK

[75] Inventors: Richard A. Wilkinson, Jr., Boulder; William C. Hunt, Lafayette; David W. Rickert, Boulder, all of Colo.

[73] Assignee: Storage Technology Partners II, Louisville, Colo.

[21] Appl. No.: 499,667

[22] Filed: May 31, 1983

[51] Int. Cl.[4] ............ G11B 5/012; G11B 5/016; G11B 23/02; G01D 15/24
[52] U.S. Cl. .................... 360/97; 360/99; 360/133; 346/137
[58] Field of Search ............... 360/99, 98, 97, 133, 360/135, 86; 346/137

[56] References Cited

U.S. PATENT DOCUMENTS

| | | | |
|---|---|---|---|
| 3,838,460 | 9/1974 | Stewart | 346/137 |
| 4,125,883 | 11/1978 | Rolph | 360/99 |
| 4,129,891 | 12/1978 | Ragle | 360/98 |
| 4,358,803 | 11/1982 | Van Der Giessen | 360/97 |
| 4,445,157 | 4/1984 | Takahashi | 360/133 |

Primary Examiner—Robert M. Kilgore
Attorney, Agent, or Firm—Bryant R. Gold

[57] ABSTRACT

A flexible hub for a disk is described. The disk includes a relatively large center hole into which a flexible planar member is mounted or clamped. The size of the flexible member is slightly larger than the hole, thereby requiring that the flexible member be slightly bowed or flexed in order for it to fit within the hole. The flexible member is preferably attached to the disk at three respective equi-angularly spaced locations around the periphery of the hole. In the center of the flexible member is a collar adapted to receive a protruding spindle neck from a spindle mechanism upon which the disk is mounted. The end of the spindle neck and the inside wall of the collar are tapered at the same angle. Insertion of the spindle neck into the collar thereby forces alignment or centering of the center of the collar with the longitudinal axis of the spindle neck.

8 Claims, 4 Drawing Figures

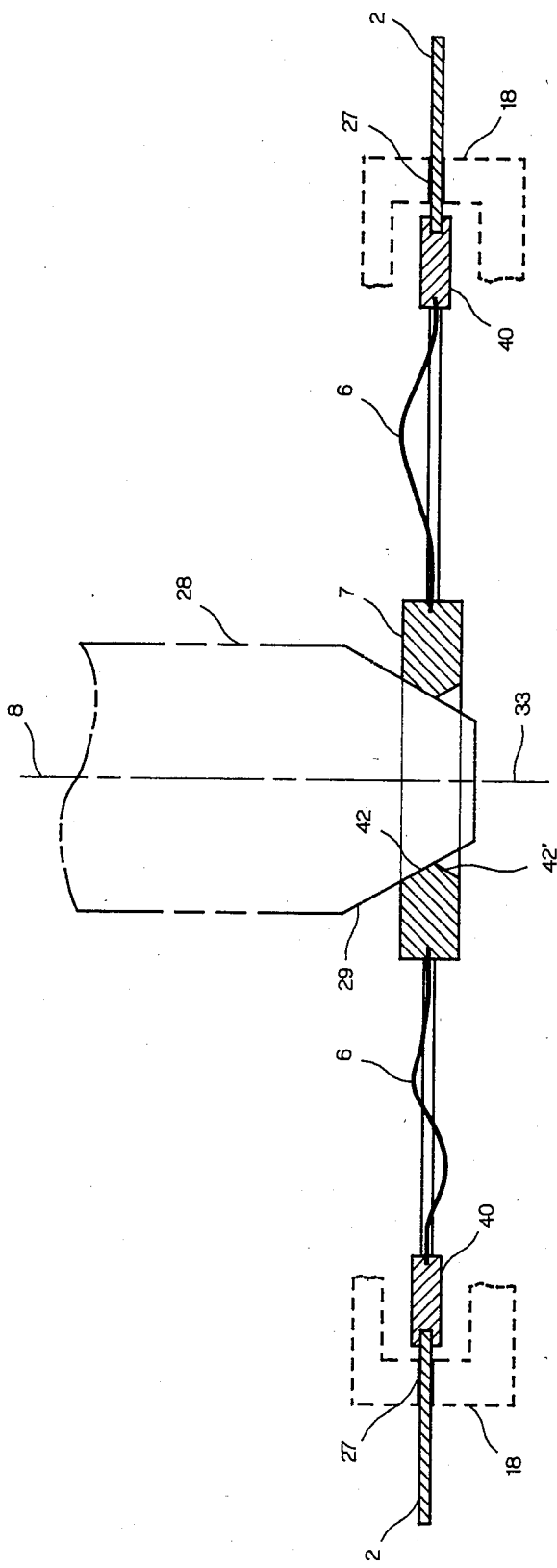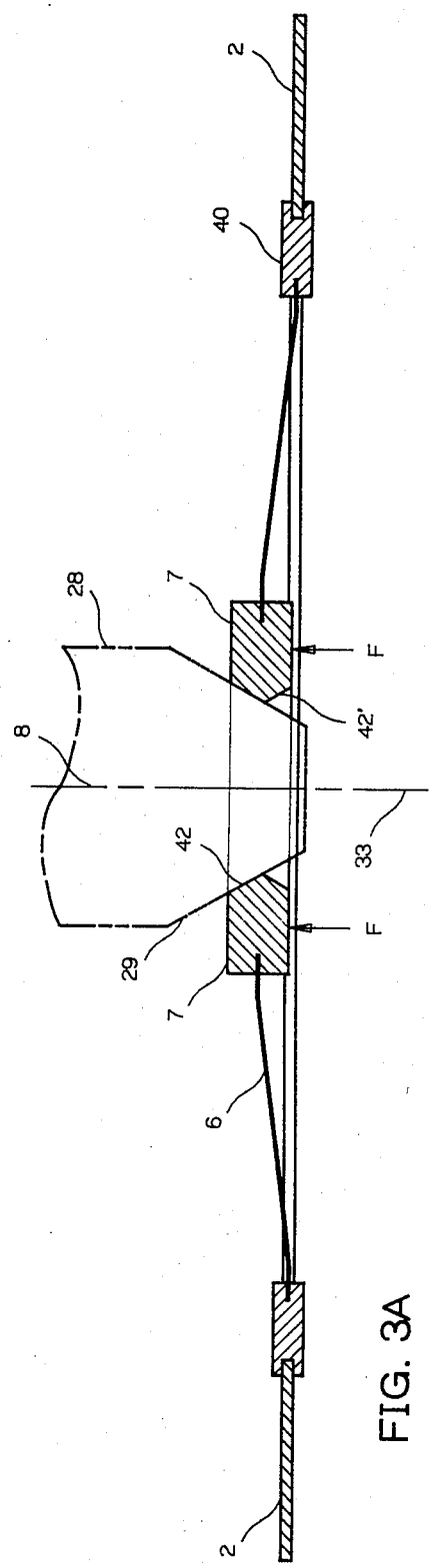
FIG. 3B
FIG. 3A

FLEXIBLE HUB FOR REMOVABLE DISK

BACKGROUND OF THE INVENTION

The present invention relates to information storage disk-handling systems, and more particularly to an improved hub for use with a removable disk that allows the disk to be accurately centered with respect to a desired rotational axis. The present invention is especially well suited for use with an automatic disk-handling apparatus, one embodiment of which is disclosed in applicants' copending application Ser. No. 481,962, filed 04/04/83 (hereafter the '962 application), which '962 application is incorporated by reference herein.

In disk storage systems, information is stored on rotating disks by selectively marking or otherwise altering the characteristics of the disk surface with a pattern or sequence that relates to the information to be stored. Information is retrieved or recovered from the disk by sensing the marked pattern or sequence through appropriate means, and reconstructing the desired information from these sensed patterns or sequences. The information is stored on the disk in a data track or tracks, that may be either concentric or spiral. The amount of information that may be placed on a given disk (the "data storage capacity") is related to how closely these data tracks may be placed on the disk surface. In the case of removable disks, the minimal spacing between adjacent data tracks is, in turn, largely dependent upon the accuracy with which the rotating disk may be aligned with a desired rotational axis (the "eccentricity" of the mounted disk) as the disks are repeatedly inserted into and removed from the information system. That is, the eccentricity of the mounted disk with respect to the rotational axis determines in large part how closely the tracks may be placed together.

The above problem—of accurately centering removable disks—is especially acute with optical disk storage systems. Such systems typically use radiant energy, e.g., from a laser beam, to mark extremely small holes or areas on the disk surface on the order of a micron in diameter. In order to achieve a maximum data capacity, it is desirable that data tracks be placed as close together as possible. For example, a desired optical disk storage system may have as many as 12,500 to 15,000 data tracks per radial inch. Such a data track density requires that the disk be extremely accurately centered each time it is inserted into the disk storage system. While appropriate tracking servo systems may compensate for some of the eccentricity that may be present, see e.g., patent application Ser. No. 438,133 filed 11/01/82, assigned to the same assignee as is the present invention, it is nonetheless desirable to have a means for accurately and repeatedly centering a removable disk to within a very tight tolerance.

SUMMARY OF THE INVENTION

It is an object of the present invention to provide an improved hub for a disk that allows the disk to be accurately centered and aligned with a desired rotational axis each time that the disk is detachably mounted for rotation.

It is a further object of the present invention to provide such a hub that is simple and inexpensive to make and attach to the disk, and a method for manufacturing the same.

Still another object of the present invention is to provide a simple and inexpensive method for centering a removable and rotatable disk in a disk storage system so that the disk may be repeatably mounted with a minimum of eccentricity.

The above and other objects of the invention are realized through the use of a flexible hub inserted into a relatively large center hole of a disk that is to be mounted and centered in a suitable disk drive system. The flexible hub is made from a suitably stiff, yet flexible, sheet material, such as a metal or metal alloy foil having a high tensil strength. At the center of the hub a collar is attached to the flexible material. This collar has a tapered inner wall. The periphery of the flexible material is attached to the disk at a minimum of three points spaced around the periphery of the large center hole of the disk. The lateral dimensions of the flexible material are such that the flexible material may be slightly bowed when inserted into the disk. This bowing typically pushes the collar out of the plane of the disk; however, the collar may be forced to be coplanar with the disk if the flexible material is allowed to buckle.

When a disk having a flexible hub in accordance with the present invention is mounted for rotation in a suitable disk drive system, the disk is brought into a position such that the center of the collar is more or less aligned with the rotational axis of a protruding spindle neck of the disk drive's spindle mechanism. The diameter of the body of the spindle neck is somewhat larger than the inside diameter of the collar. However, the protruding end of the spindle neck is tapered, having an angle that matches the taper of the inner wall of the collar, thereby allowing the tip of the spindle neck, which has a smaller diameter than the body of the spindle neck because of the taper, to be inserted into the collar. Once the collar is more or less aligned with the longitudinal axis of the spindle neck, appropriate external forces are used to push or lift the collar out of the plane of the disk so as to be nearest the spindle neck. The distance between the spindle neck and the collar is then longitudinally decreased until the taper of the spindle neck is snuggly up against the taper of the collar, thereby accurately aligning the center of the collar with the rotational axis of the spindle.

After alignment is achieved between the collar and the rotational axis of the spindle, with the collar flexed out of the plane of the disk, additional external forces are used to force the collar back towards the plane of the disk while still maintaining the desired alignment between the collar and rotational axis of the spindle. The disk is then aligned with a registration surface of the spindle mechanism in order to place it in a desired operating plane and a suitable clamping mechanism is used to securely hold the disk in the desired aligned positions (the disk is aligned and clamped both laterally—with the desired rotational axis—and longitudinally—with a desired plane of rotation). After clamping the disk, appropriate rotational means are used to spin the disk about the rotational axis of the spindle. Advantageously, these rotational forces spin the disk without exerting any rotational forces on the collar and flexible material. That is, once clamped into its aligned position, the disk rotates as though the flexible hub were not present.

BRIEF DESCRIPTION OF THE DRAWINGS

The above and other objects, features, and advantages of the present invention will be more apparent from the following more particular description thereof, presented in conjunction with the following drawings wherein:

FIG. 3A is a sectional view taken along the line 3—3 of FIG. 2, and illustrates how the collar of the flexible hub, forced out of the plane of the disk, is first aligned with the spindle neck of the spindle mechanism; and FIG. 3B is likewise a sectional view taken along the line 3—3 of FIG. 2, and illustrates the buckling (greatly exaggerated) that may occur in the flexible hub when the disk is clamped into its rotational position, and further shows how the disk is clamped in its centered position.

DETAILED DESCRIPTION OF THE INVENTION

The present invention is best understood by reference to the drawings, wherein like numerals will be used to describe like parts throughout. Moreover, wherever possible, the same numerals are used to describe like parts between this application and the previously cited '962 application.

Figure 1:
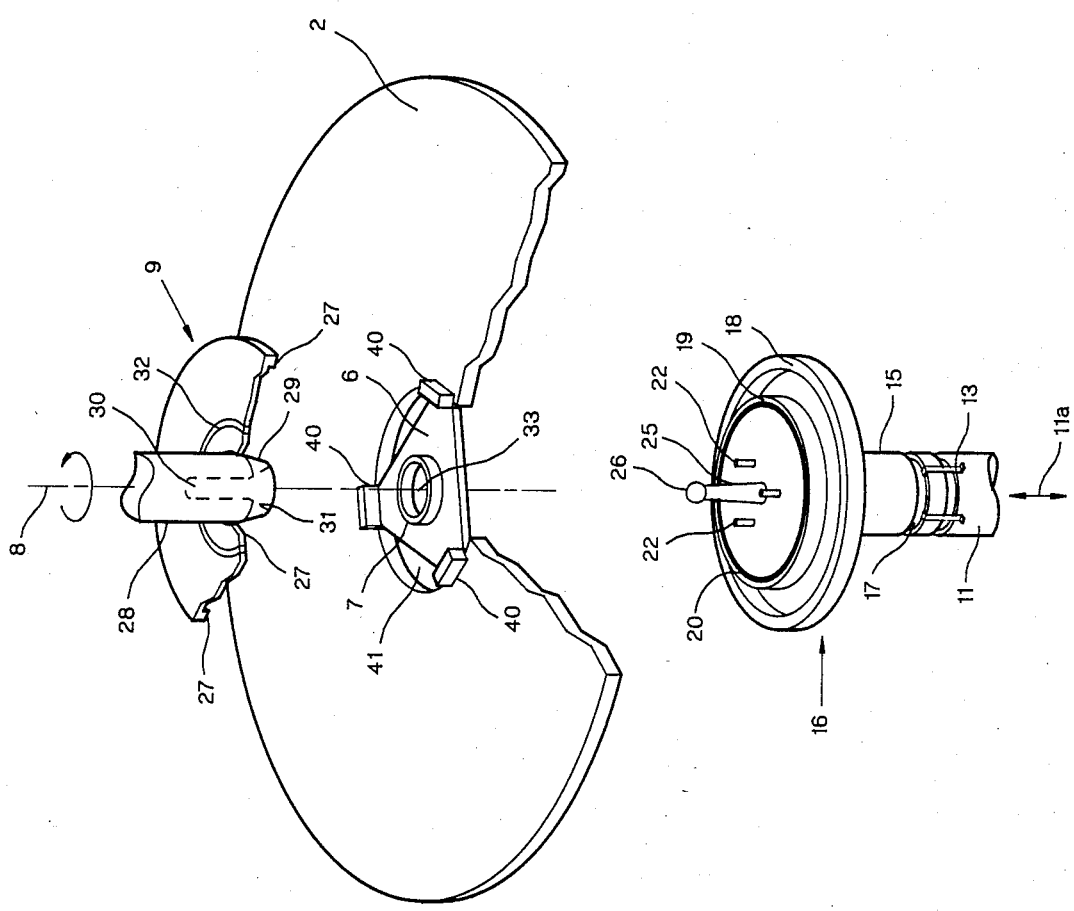
FIG. 1 is a simplified perspective view, portions of which are cut away, of a disk having a flexible hub in accordance with the present invention, and illustrates the principle elements of a spindle mechanism which could be used to align and rotate such a disk.

Referring first to FIG. 1, there is shown a perspective view of a disk 2 having a relatively large hole 41 in the center thereof. A suitable piece of relatively thin material 6 is configured to be fastened to the disk 2 at three locations around the edge of the hole 41. Clamps 40 are used for this purpose. In the center of the flexible material 6 is a collar 7 having a centerline 33 associated therewith. The collar 7, as best seen in FIGS. 3A and 3B, has interior tapered edges 42 and 42′.

Still referring to FIG. 1, a spindle mechanism 9 includes a spindle neck 28, a registration surface 27, and a steel armature ring 32, all of which rotate about a rotational axis 8. One end of the spindle neck 28 has an outer neck taper 29. Also, the spindle neck 28 includes an interior neck passage 30 that includes an interior passage taper 31. (Additional details and elements associated with the spindle 9 can be found in the previously cited '962 application.)

Below the disk 2 is found an elevator head 11 that is controlled by an elevator motor (not shown) so as to controllably move the head 11 in the direction shown by the double headed arrow 11a. Fingers 13 securely hold a support hub 15 to the elevator head 11 during the load/unload process. However, as explained in the aforecited '962 application, these fingers 13 release the support hub 15 from the elevator head 11 when the disk is being rotated.

A disk support platter 16 is securely affixed to, or an integral part of, the support hub 15. The platter 16 includes a raised outer rim 18 and a raised inner rim 19. Embedded in the inner rim 19 is a magnet ring 20. A plurality of plunger pins 22 are likewise selectively placed within the inner ring 19. As explained more fully in the previously cited '962 application, during a load operation these plunger pins 22 make contact with the collar 7, thereby pushing the collar 7 out of the plane of the disk, as the disk-centering process is carried out.

Also forming part of the disk support platter 16 is a centering stem 25 that includes a ball-shaped upper end 26. As the disk 2 is centered on the spindle 9, the centering stem 25 is received within the interior neck passage 30 of the spindle neck 28. Clamping of the disk in its aligned positions is achieved by securely gripping the disk, near the periphery of the hole 41, between the raised outer rim 18 of the disk support platter 16 and the registration surface 27 of the spindle mechanism 9, as best shown in FIG. 3B. (In this respect, it should be noted that FIG. 1 is intended to correspond with FIG. 5 of the previously cited '962 application.) As force holding the rim 18 against the disk 2 and registration surface 27 is provided by a magnetic circuit that comprises the permanent magnet 20 and steel armature ring 32. The flexible material 6 is constrained to lie within an "airgap" of this magnetic circuit, thereby isolating the hub (flexible material 6 and collar 7) from the rotational forces of the spindle. As explained previously, during rotation the disk support platter 16, including it's support hub 15, are decoupled from the elevator head 11 by releasing the fingers 13.

Figure 2:
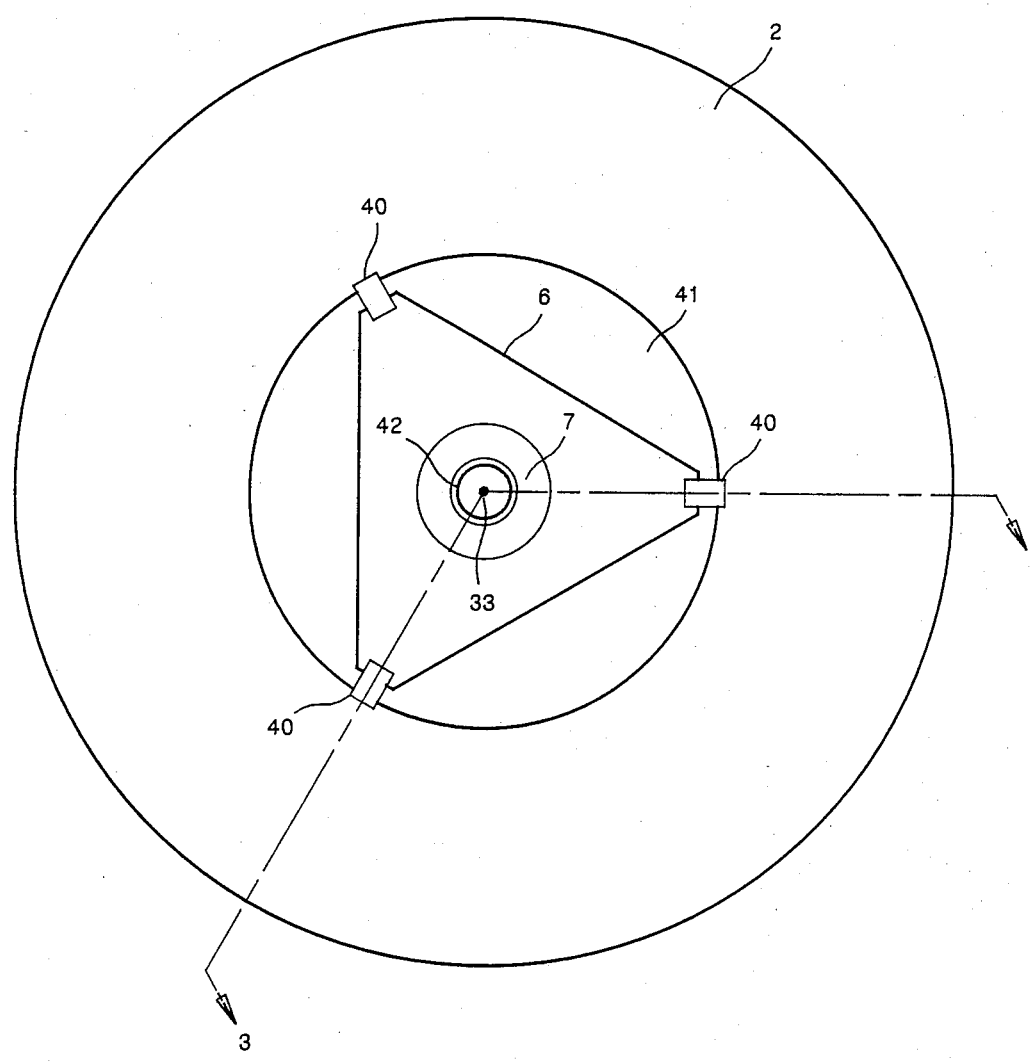
FIG. 2 is a top view of an information storage disk having a flexible hub in accordance with the present invention.

The details associated with the flexible hub of the present invention are best seen in FIGS. 2, 3A, and 3B. The flexible material 6, when clamped to the disk 2 by means of the clamps 40, may be slightly bowed or buckled. The amount of bowing or buckling is not large, but is illustrated in FIG. 3B (greatly exagurated) as it might appear when the collar 7 is forced to lie in the same plane as the disk 2. In a preferred embodiment incorporating a disk having a 14 inch outer diameter, and a hole 41 having a diameter of 6.625 inches, the collar 7 is allowed to bow out of the plane of the disk only about 0.020 inches.

In operation, the disk 2 is slid into position so that the center axis 33 of the collar 7 is more or less aligned with the rotational axis 8 of the spindle 9. The elevator head 11 then lifts the support platter 16 until the plunger pins 22 make contact with the collar 7. This contact forces the collar 7 out of the plane of the disk 2, as illustrated in FIG. 3A. (The force F shown in FIG. 3A that lifts the collar 7 out of the plane of the disk 2 is the force, in the preferred embodiment, imparted by the plunger pins 22 as they contact the collar 7.) The elevator head 11 continues to lift the collar 7 until the outer neck taper 29 of the spindle neck 28 is held securely against the collar taper 42. This action of forcing the spindle neck taper 29 against the inner collar taper 42 forces the collar 7 to slide horizontally (laterally) until its centerline 33 is aligned with the rotational axis of the spindle 8. Once the collar 7 is aligned with the rotational axis 8, then the elevator head 11 continues to raise the disk 2 until such times as it is securely in contact with the registration surface 27 of the spindle mechanism 9, as shown in FIG. 3B. Once this contact with the registration surface 27 occurs the disk 2 is locked or clamped into this aligned position by means of a magnetic clamp comprising the magnet ring 20 and steel armature 32. This magnetic clamp securely holds the raised upper rim 18 against the lower surface of the disk 2 below the registration surface 27. Once so clamped, the spindle 9 rotates the disk 2, and this rotation will be centered about the desired rotational axis 8.

It is significant to note that once the disk 2 has been clamped to the desired aligned position, by the magnetic clamping action of the magnet ring 20 and steel armature 32, the flexible hub serves no further purpose. That is, rotation of the disk occurs because the disk support platter 16 is rotated as the spindle 9 rotates. The flexible hub of the present invention is therefore used only to center the disk with respect to the rotational axis, and once this centering has been achieved, and the disk is clamped into its aligned position, the flexible hub serves no further purpose.

Advantageously, the clamps 40 may be realized simply and inexpensively using any suitable clamping means, such as ultrasonically welding, or otherwise bonding together, injection molded parts or pieces. The centering collar 7 may be realized from any suitable durable material, such as a glass filled polycarbonate. The inside tapered surfaces of the collar 7 should be treated for a small coefficient of friction. The flexible material 6 may likewise be realized from any suitably stiff, yet flexible, material that is readily available. For example, in the embodiments of the invention fabricated to date, a beryllium copper (BeCu) sheet alloy has been used having a thickness of 0.006 inches. The spacing between the magnet ring 20 and the steel armature 32 when the disk 2 is in it's clamped position is such that this BeCu flexible material lies in an air gap between the elements of the magnetic clamp.

The flexible material 6 must be bonded to the periphery of the disk hole 41 at at least 3 points. Three points impart the minimum distortion to the flat disk and still provide good radial stiffness to the flexible material. That is, because the flexible material 6 does flex and buckle, using the minimum number of bonding points reduces the amount of stress that may be imparted to the disk 2. Any such stresses, if transferred to the disk through a large number of bonding points, could cause disk distortion, which is highly undesirable for a precision system such as an optical disk drive system.

The invention as thus described has yielded results to date beyond expectations. In the optical disk system which represents the preferred application of the present invention, a system specification of 0.001 inches (maximum eccentricity) has been the desired goal. This specification presented a formidable challenge for a removable disk system prior to the conception of the present invention, especially for a low cost hub. However, test results to date indicate that through the use of the present invention the disk can be repeatably centered to within about 500 microinches (0.0005 inches), a two fold improvement over what had been difficult to realize previously.

In summary, it is to be emphasized that the flexible hub as described herein allows accurate centering and aligning to occur through a three step process: (1) The centering collar 7, typically flexed out of the plane of the disk 2, is first aligned with the spindle neck 28, thereby laterally moving the disk to the desired rotational position; (2) once the collar is so centered, the disk is pushed against the registration surface of the spindle, thereby longitudinally moving the disk into the desired rotational plane, during which process the collar may be flexed back into the plane of the disk; and (3) the disk 2 is clamped into this "centered position". Because of the buckling of the flexible material 6, this "centered position" may not actually be the true center of the disk; however, it will be a repeatable "center position" that can be easily located again and again as the removable disk is repeatidly and detachably mounted to the disk drive. Moreover, because the flexible material 6 is an integral piece of material having a uniform thermal coefficient of expansion, and because the material is connected to the disk at points that are equiangularly spaced around the periphery of the hole 41 of the disk, temperature changes will not significantly alter the location of this desired "centered position".

It is also to be noted that the present invention can be easily manufactured without the need for expensive machined parts to be used within the flexible hub. To illustrate, while it is important that the sheet material be allowed to flex or bow a desired amount out of the plane of the disk, a simple manufacturing fixture can be used for this purpose. After the sheet material has been cut to a desired shape, preferably a symetrical shape having three equi-angularly protruding tabs, the cut sheet material may be laid over the fixture, which fixture has the desired amount of bowing, relative to a flat reference surface upon which the disk may be placed, built thereinto. With the fixture causing the desired amount of bowing to be present, the cut sheet material may be easily clamped to the disk at the three protruding tabs. Advantageously, the collar may be attached to the center of the cut sheet material before or after the sheet material is bowed and attached to the disk. Hence, as described, there is no need for tight tolerance parts to be used within the flexible hub. This is important in order to keep the cost of the hub low.

While a preferred embodiment of the present invention has been disclosed herein, numerous modifications could be made thereto by those skilled in the art without departing from the spirit and scope of the present invention. The scope of the invention is therefore to be determined from the claims that follow.

What is claimed is:

1. A flexible hub for use with a removable flat disk said disk having a relatively large first hole in the center thereof, said flexible hub comprising:
    a stiff yet flexible planar piece of material having a second hole substantially in the center thereof, said planar material being attached to the periphery of the first hole of said flat disk at at least three locations, said planar material having lateral dimensions that cause it to be bowed when attached to the periphery of the first hole and
    a collar affixed to said planar material in the second hole thereof, said collar having a tapered inner edge.

2. The flexible hub as defined in claim 1 wherein said flexible planar material is attached to said disk at three and only three locations that are equi-angularly spaced around the periphery of said first hole.

3. The flexible hub as defined in claim 2 wherein said flexible planar material comprises planar material having a symetrical shape with three attaching tabs.

4. The flexible hub as defined in claim 3 wherein said flexible material is a high tensil strength material.

5. The flexible hub as defined in claim 4 wherein said high tensil strength material comprises beryllium copper (BeCu).

6. The flexible hub as defined in claim 4 wherein said high tensil strength material has a thickness of from 0.003 to 0.009 inches.

7. The flexible hub as defined in claim 2 where the material of said collar and its surface treatment are selected for durability and small coefficient of friction.

8. The flexible hub as defined in claim 7 wherein the inner edge of said collar tapers inwardly towards the center of the collar from both sides of said collar, whereby said disk may be used with a spindle mechanism, and a tapered end of a spindle neck of said spindle mechanism will match the corresponding taper of the inner edge of said collar, regardless of which side of said disk is facing said spindle mechanism.

* * * * *